April 23, 1963  E. L. CLARK  3,086,846
PROCESS FOR THE RECOVERY OF SULFURIC ACID FROM METALLIC SULFATES
Filed March 17, 1958
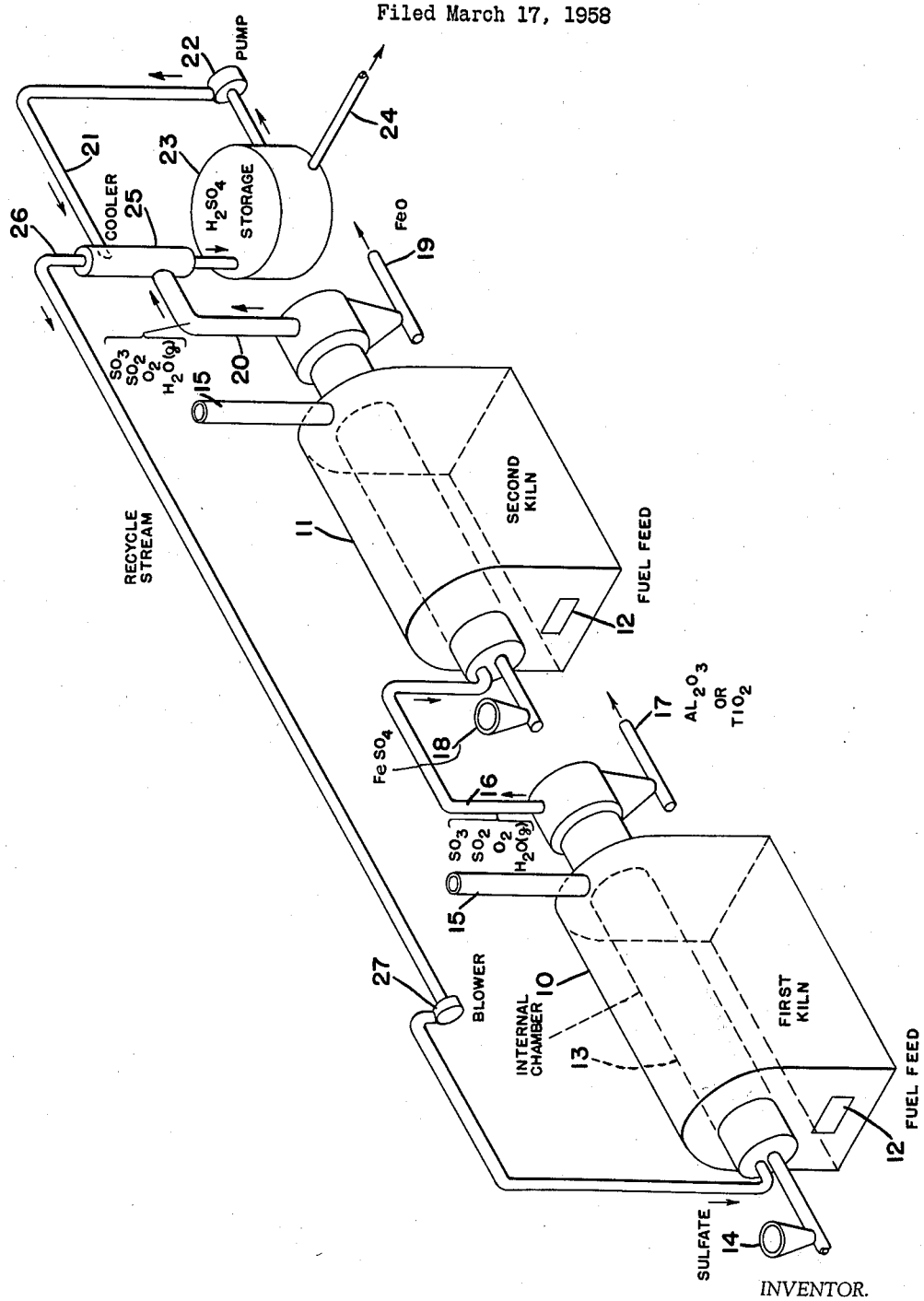
INVENTOR.
EZEKAIL L. CLARK
BY
*Fay & Fay*
ATTORNEYS 3,086,846
PROCESS FOR THE RECOVERY OF SULFURIC ACID FROM METALLIC SULFATES
Ezekail L. Clark, Pittsburgh, Pa., assignor to The North American Coal Corporation, Cleveland, Ohio, a corporation of Ohio
Filed Mar. 17, 1958, Ser. No. 721,898
9 Claims. (Cl. 23—167)

This invention relates to a metallurgical process and particularly one in which there is a separation of ferrous sulfate and/or other sulfates, as well as the decomposition of the sulfates to produce $SO_2$ and sulfuric acid.

In general in connection with metallurgical processing, it is known that frequently products such as aluminum sulfate, $Al_2(SO_4)_3$, and/or ferrous sulfate, $FeSO_4 \cdot XH_2O$, are used, and these may be derived from the processing of aluminum bearing ores and/or other ores such as ilmenite ores, etc.

It is also desirable in such separations to calcine the sulfates and to recover the evolved gases $SO_2$, $O_2$ and $SO_3$, and as well to recover the oxide products, $Al_2O_3$, $Fe_2O_3$, in as pure a form as possible so that they may be valuable materials.

In this present invention I propose to take aluminum sulfate, $XH_2O$ and ferrous sulfate and to calcine these materials and recycle the $SO_2$ gases in a novel manner about to be described.

In general in connection with mineral dressing and/or treatment of ores, there are many leaching processes involving sulfuric acid treatments of natural minerals or by-products from mineral processing. In such processes the desired metal values of the ores under treatment are usually recovered as sulfates. By some separation technique these sulfates are separated and then decomposed to yield the metal oxides with or without recovery of the acid gases given off in the decomposition which include $SO_2$, $SO_3$ and $O_2$. In some processes it has been known to recycle these into a sulfuric acid chamber system for the recovery of sulfuric acid and, as an example, it has been taught in McBerty Patent No. 2,098,056.

Because of the frequency of iron in connection with various minerals, for example ilmenite, and aluminum bearing ores where iron occurs, it is necessary to remove the iron from the product. It is, however, necessary to get the maximum recovery without having very complex systems or completely duplicating all of the steps of the calcining processes involved in the decomposition, together with that of the sulfuric acid recovery techniques in the contact or other processes.

In my proposed process the decomposition of sulfates may be carried out in a rotary kiln, pebble furnace or fluidized bed, but there should be indirect heating of the calcined product, together with a recirculation of the gases in a series decomposition process.

While principally the disclosure herein is written around the separation of aluminum sulfate and ferrous sulfate, it is realized that this may be worked with other combinations such as those of lead, zinc, titanium or silver sulfate, all of which decompose at high temperature and permit imilas economies as disclosed in connection with this process.

An object of this invention is to provide a new and improved decomposition of separate sulfate streams, one of which is a ferrous sulfate and some other decomposing sulfate, and to recycle the gases in a novel manner to reform sulfuric acid.

A further object of this invention is to utilize the recycled $SO_2$ to shift the equilibrium in favor of the formation of sulfur trioxide in this series decomposition of metallic sulfates.

A further object of this invention is to decompose metallic sulfates and produce sulfuric acid with a minimum decomposition of the sulfur trioxide formed into sulfur dioxide and oxygen.

To the accomplishment of the foregoing and related ends, said invention then consists of the means hereinafter fully described and particularly pointed out in the claims; the following description setting forth in detail one approved method of carrying out the invention, such disclosed method, however, constituting but one of the various ways in which the principles of the invention may be used.

The accompanying drawing is a diagrammatic view of the processing of aluminum sulfate and ferrous sulfate to produce $FeO$ and $Al_2O_3$.

In general in connection with the decomposition of metal sulfates, such as iron and aluminum, certain conditions exist which will be more clearly understood from the equations explained below.

(1) $\qquad FeSO_4 \rightarrow FeO + SO_3$
(2) $\qquad Fe_2(SO_4)_3 \rightarrow Fe_2O_3 + 3SO_3$
(3) $\qquad Al_2(SO_4)_3 \rightarrow Al_2O_3 + 3SO_3$
(4) $\qquad SO_3 \leftrightarrow SO_2 + \tfrac{1}{2}O_2$
(5) $\qquad SO_3 + H_2O \rightarrow H_2SO_4$ It will be seen that Equations 1, 2 and 3 indicate the mode of decomposition of the two possible sulfates of iron and of aluminum sulfate. Equation 4 is the decomposition of sulfur trioxide into oxygen and sulfur dioxide, and this is the basic equation upon which all contact sulfuric acid production is based and the shifting of this equilibrium with temperature and pressure is very important to control of the process. Equation 5 indicates the method by which sulfuric acid may be formed by reacting sulfur trioxide with water. It is easy to see that if the sulfur trioxide from Equation 4 is allowed to decompose, the amount of sulfuric acid produced will be correspondingly decreased. Although it is well known that sulfur dioxide can be made into sulfuric acid by the contact and/or other processes, this equipment is expensive and it is desirable to prevent the decomposition of the trioxide into the sulfur dioxide as far as possible.

The extent of decomposition of the trioxide depends on the temperature of the gas and the concentration of sulfur dioxide and sulfur trioxide in the gaseous mixture. Data are available on the equilibrium of this reaction and, of course, it is well known that at the temperatures necessary to decompose many sulfates, a considerable fraction of the sulfur trioxide will itself decompose to form sulfur dioxide and oxygen by the reaction of Equation 4.

One particular example of this will be seen in connection with Equation 6 which follows and this is the decomposition of the monohydrate of aluminum sulfate. While Equations 1 and 3 have shown the decomposition of anhydrous sulfates, the resulting product from a leaching process is usually a partially hydrated material. Consequently, when I decompose a hydrated sulfate, as in Equation 6, water vapor is part of the gaseous mixture.

(6) $\qquad Al_2(SO_4)_3 \cdot H_2O \rightarrow Al_2O_3 + 3SO_3 + H_2O$

This decomposition takes place at approximately 770° C. and at a pressure of about one atmosphere. At this condition the equilibrium constant (K) for the reaction $SO_2 + \tfrac{1}{2}O_2 \rightarrow SO_3$, which is the reverse of the decomposition reaction shown in Equation 4, is 2.5. This condition is shown by the following Equation 7.

(7)
$$K = \frac{n_{SO_3}}{(n_{SO_2})(n_{O_2})^{1/2}} \left[ \frac{\pi}{n_{SO_2} + n_{SO_3} + n_{O_2} + n_{H_2O}} \right]^{-1/2}$$

where $n$ represents the number of lb. mols of the various gases denoted as subscripts $\pi$ represents the total pressure When I compared the calculated result according to Equation 7 with the test result, I found they compared very favorably and that approximately one-half of the sulfur trioxide was decomposed when the aluminum sulfate was decomposed. Further, this condition was greatly improved by recycling sulfur dioxide to force the reaction given by Equation 4 in the opposite direction.

If I added 10 mols of sulfur dioxide to the gaseous mixture, I found that less than 10 percent of the sulfur trioxide formed by the aluminum sulfate decomposition is decomposed. Thus, I was able to practically eliminate the decomposition of sulfur trioxide under ideal conditions, providing, of course, that the sulfur dioxide is recycled and that equilibrium is reached.

In connection with the decomposition of iron sulfate which takes place at temperatures above 480° C., the following conditions were found to exist.

(8) $\quad FeSO_4 \cdot 3H_2O \rightarrow FeO + SO_3 + 3H_2O$ (9) $\quad SO_2 + \frac{1}{2}O_2 \rightarrow SO_3$ For these conditions the equilibrium constant in Equation 9 is about 100. At this lower temperature less than 10 percent of the $SO_3$ decomposes, and this small amount of decomposition can be considerably reduced by recycling a moderate amount of $SO_2$. This was done on a test scale with almost complete recovery of the $SO_3$ produced by decomposition of iron sulfate. This $SO_3$ and water vapor in the gaseous mixture were condensed as sulfuric acid of high concentration (over 90 percent) by cooling the gases obtained by the decomposition according to Equation 5.

In connection with these reactions for ferrous sulfate, equilibrium conditions were wound to exist, and the catalytic action of the iron compounds in increasing the speed of the $SO_2$-to-$SO_3$ reaction was shown by these tests to be practical. Other techniques have disclosed the catalytic activity of iron compounds in this regard, but not necessarily during the decomposition of iron sulfate.

Because the decomposition of these sulfates are endothermic processes and require substantial heat of the order of magnitude of 135,000 B.t.u. per pound mol of ferrous sulfate and 195,000 B.t.u. per pound mol of aluminum sulfate, these were done in indirect fired rotary kilns. To improve the heat efficiency of the process, series decomposition of the sulfates was employed, and this will be illustrated in the drawing which shows a typical combined process involving iron and aluminum sulfates. Two kilns were employed, kiln 10 being the first in the series and kiln 11 being the second. Each is indirect fired as by means of coal or other fuel at 12 and has an internal chamber 13 in which the sulfates are decomposed. It is to be understood, of course, that fluidized reactors or pebble furnaces may be employed in place of the kilns. In the drawing the aluminum sulfate feed chamber is shown at 14, and the feed passes to the central chamber where the sulfate decomposes. The decomposition gases from the kiln pass out at 16 and the oxides pass out a bottom opening as seen at 17 with the product going to storage.

At this stage the gases are then passed into the second kiln 11 near feed chamber 18 where the ferrous sulfate is fed into the second kiln 11. The products from this are iron oxides as shown at 19, and the decomposition gases, which are $SO_2$, $SO_3$, $H_2O$ and $O_2$, are shown at 20. These are passed to a cooler chamber wherein sulfuric acid may be condensed by indirect cooling, or sulfuric acid or other liquid may be fed into this chamber to collect the acid or to concentrate the acid, according to Equation 5, said acid passing in at 21 by means of a pump 22 from a storage chamber 23. The recovered sulfuric acid is passed out at 24.

The $SO_2$ passes out through the top of the cooler section 25 and is recycled as seen at 26 by means of blowers 27. Heaters or other means may be used in connection with the recycle gas to control the temperature. The first of the kilns operates at temperatures above 770° C., and the second operates at 480° to 770° C.

The following equations designated (10) and (11) are illustrative of the components in a set amount of coal refuse in connection with this process.

(10) $\quad 3Al_2(SO_4)_3 \cdot H_2O \rightarrow 3Al_2O_3 + 3H_2O + 9SO_3$

(11) $\quad 2FeSO_4 \cdot 3H_2O \rightarrow 2FeO + 6H_2O + 2SO_3$

This material may contain 2 mols of water as free moisture. If I combine the gases from this ratio of aluminum and iron sulfates, I have the following gaseous mixture leaving the iron sulfate kiln:

11 mols $SO_3$, 11 mols $H_2O$

Upon testing this material, it was seen that approximately this ratio existed and that 7 percent of the $SO_3$ decomposed to $SO_2$ and oxygen. To this mixture about 3 mols of $SO_2$ were circulated with the gaseous mixture and the decomposition was less than 1 percent in the test runs. This showed that only one recirculation system was required and that the decomposition of the sulfur trioxide was very low and reduced to a relatively insignificant quantity with a smaller quantity of recycle gas of $SO_2$.

It was further found that the iron compounds were catalytic agents accelerating the reaction between $SO_3$ and $SO_2$, to the point that the equilibrium conditions occurred quite rapidly. In passing the decomposition gases from the aluminum sulfate through the iron oxide kiln, they were exposed to this catalytic activity.

Further in connection with the heat efficiencies involved, it should be stated that since the aluminum sulfate kiln operates at considerably higher temperatures than the iron sulfate kiln, the gases are utilized directly without additional heat recovery equipment. In a typical plant for the production of alumina and iron oxide it has been calculated that 20 percent of the heat requirement for the iron sulfate kiln can be recovered from the by-product gases of the aluminum sulfate kiln.

Another application of this might be the recovery of titanium oxide from ilmenite ores. These ores are leached with sulfuric acid to convert iron and titanium into sulfates. The iron sulfate is precipitated as ferrous sulfate. The titanium is precipitated as titanium oxy-sulfate. The oxy-sulfate is then converted to titanium oxide by heating to temperatures above 500° C.

A series of two kilns identical to that shown in the drawing for the combination of aluminum and iron sulfate could be used. The titanium oxy-sulfate would be fed to the first kiln to produce titanium oxide. The gases produced by this decomposition would be conveyed to the second kiln into which the ferrous sulfate is fed. The combined gases would be cooled to recover sulfuric acid and part of the $SO_2$ would be recycled as described in the process for aluminum and iron sulfates. In this case the kilns would be at similar temperatures so some preheating of the gases might be required between kilns. As stated previously, fluidized reactors or pebble furnaces may be employed in place of kilns.

Although the present invention has been described in connection with a few preferred embodiments thereof, variations and modifications may be resorted to by those skilled in the art without departing from the principles of the invention. All of these variations and modifications are considered to be within the true spirit and scope of the present invention as disclosed in the foregoing description and defined by the appended claims.

I claim:

1. A continuous method of preparing sulfuric acid which comprises the steps of (1) thermally decomposing a metal sulfate in the presence of recycled sulfur dioxide gas to obtain the decomposition products comprising sulfur trioxide, sulfur dioxide, oxygen, and the metal oxide; (2) removing the metal oxide and mixing the remaining gases with iron sulfate at a temperature above 480° C. to decompose the iron sulfate and catalyze the conversion of $SO_2$ to $SO_3$; (3) removing the iron oxide obtained from decomposing the iron sulfate; and (4) converting the remaining sulfur trioxide gas to sulfuric acid as the unconverted sulfur dioxide gas is recycled to the initial step of decomposing the metal sulfate.

2. A continuous method of claim 1 further characterized in that the metal sulfate is aluminum sulfate.

3. A continuous method of claim 2 further characterized in that the sulfur trioxide gas is converted to sulfuric acid with water.

4. A continuous method of claim 2 further characterized in that the sulfur trioxide is converted with sulfuric acid to a more concentrated acid.

5. A continuous method of preparing sulfuric acid by separately decomposing a metal sulfate and an iron sulfate; said iron sulfate decomposed to iron oxide which is a catalyst for the preparation of sulfur trioxide illustrated by the reaction $2SO_2+O_2 \rightleftarrows 2SO_3$, said method comprising the steps of (1) calcining the metal sulfate in the presence of recycled sulfur dioxide gas to obtain the decomposition products comprising the metal oxide, oxygen, sulfur dioxide, and sulfur trioxide; (2) removing the metal oxide obtained and passing the remaining gases to a subsequent calcination of iron sulfate which is in series with the preceding sulfate calcination; (3) calcining the iron sulfate in the presence of said gases to obtain the decomposition products comprising iron oxide, oxygen, sulfur dioxide, sulfur trioxide, and water vapor; (4) removing the iron oxide and recycling the sulfur dioxide gas to the initial calcination step; and (5) cooling the remaining sulfur trioxide gas and water vapor to obtain the sulfuric acid.

6. The continuous method of claim 5 further characterized in that the metal sulfate is aluminum sulfate.

7. The continuous method of claim 5 further characterized in that the metal sulfate is titanium sulfate.

8. The continuous method of claim 5 further characterized in that the remaining sulfur trioxide is converted to sulfuric acid with water.

9. The continuous method of claim 5 further characterized in that the remaining sulfur trioxide is converted with sulfuric acid to a more concentrated acid.

References Cited in the file of this patent

UNITED STATES PATENTS

| | | |
|---|---|---|
| 692,008 | Frolich et al. | Jan. 28, 1902 |
| 2,128,108 | Tyrer et al. | Aug. 23, 1938 |
| 2,215,394 | Hechenbleikner et al. | Sept. 17, 1940 |
| 2,255,445 | Clarkson | Sept. 9, 1941 |
| 2,773,741 | Antonsen | Dec. 11, 1956 |